US012537077B2

(12) United States Patent
Dambman et al.

(10) Patent No.: US 12,537,077 B2
(45) Date of Patent: Jan. 27, 2026

(54) DATA SERVICES MODELING AND MANAGER FOR TRANSFORMATION AND CONTEXTUALIZATION OF DATA IN AUTOMATED PERFORMANCE OF WORKFLOWS

(71) Applicant: Biosero Inc., San Diego, CA (US)

(72) Inventors: Jonathan David Dambman, San Diego, CA (US); Prabhakar Henry, San Diego, CA (US); Andrew St. Yves, Colchester (GB); Corey McCoy, Prescott, AZ (US); William B. Gray, San Diego, CA (US)

(73) Assignee: Biosero Inc., San Diego, CA (US)

( * ) Notice: Subject to any disclaimer, the term of this patent is extended or adjusted under 35 U.S.C. 154(b) by 232 days.

(21) Appl. No.: 18/300,455

(22) Filed: Apr. 14, 2023

(65) Prior Publication Data

US 2023/0335236 A1 Oct. 19, 2023

Related U.S. Application Data

(60) Provisional application No. 63/363,000, filed on Apr. 14, 2022.

(51) Int. Cl.
*G16H 10/40* (2018.01)
(52) U.S. Cl.
CPC ................... *G16H 10/40* (2018.01)
(58) Field of Classification Search
CPC ............... G16H 10/40; G16H 40/20
See application file for complete search history.

(56) References Cited

U.S. PATENT DOCUMENTS 8,078,487 B2 12/2011 Li et al.
9,165,117 B2 * 10/2015 Teller .................. A61B 5/11
(Continued)

FOREIGN PATENT DOCUMENTS

WO 2021092232 A1 5/2021

OTHER PUBLICATIONS

Luckcuck, Matt, et al., "Formal Specification and Verification of Autonomous Robotic Systems: A Survey", 2019.
(Continued)

*Primary Examiner* — Joshua B Blanchette
(74) *Attorney, Agent, or Firm* — UltimatEdge IP Law Group, P.C.; Dean G. Stathakis (57) ABSTRACT

A data services modeling framework provides for event contextualization from state changes in events within laboratory workflows, and for orchestrating activities in workflow cycles. The data services modeling framework forms a part of data services within an orchestrator software package that provides a set of dynamic processes within laboratory workflows, for improving and enhancing workflow performance. The data services modeling framework includes a data services model configured to analyze state changes in event data, by applying algorithms for isolating the activities producing state changes, re-creating an event state, analyzing data points defining state changes to explain the event state at relevant time periods in the workflow cycle. The data services modeling framework also enables publication of messages representing contextualized event data for subscription with the orchestrator environment.

19 Claims, 3 Drawing Sheets

(56) References Cited

U.S. PATENT DOCUMENTS

| | | |
|---|---|---|
| 11,420,327 B2 | 8/2022 | Dambman et al. |
| 2002/0078432 A1 | 6/2002 | Charisius et al. |
| 2002/0147515 A1 | 10/2002 | Fava et al. |
| 2005/0234577 A1 | 10/2005 | Loughran et al. |
| 2012/0110274 A1 | 5/2012 | Rosales et al. |
| 2013/0110274 A1 | 5/2013 | D'Mura et al. |
| 2013/0128035 A1 | 5/2013 | Johns et al. |
| 2016/0121487 A1 | 5/2016 | Mohan et al. |
| 2017/0050321 A1 | 2/2017 | Look et al. |
| 2017/0327247 A1 | 11/2017 | Dike et al. |
| 2017/0372442 A1 | 12/2017 | Mejias |
| 2018/0085914 A1 | 3/2018 | Kuffner et al. |
| 2019/0033819 A1 | 1/2019 | Chao et al. |
| 2020/0043604 A1* | 2/2020 | Singh ............... G06N 5/02 |
| 2020/0094411 A1 | 3/2020 | Tan et al. |
| 2020/0171647 A1 | 6/2020 | Theobald |
| 2021/0097120 A1* | 4/2021 | Gutierrez ........... G06F 16/9535 |
| 2021/0129327 A1* | 5/2021 | Dambman ............. B25J 9/1661 |
| 2022/0266445 A1 | 8/2022 | Dambman et al. |
| 2022/0355476 A1 | 11/2022 | Dambman et al. |

OTHER PUBLICATIONS

WIPO, PCT Form ISA237, Written Opinion for International Patent Application Serial No. PCT/US2023/065752. pp. 6 (Nov. 6, 2023).

WIPO, PCT Form ISA210, International Search Report for International Patent Application Serial No. PCT/US2023/065752, pp. 3 (Nov. 6, 2023).

WIPO, PCT Form ISA210 International Search Report for PCT/US2020/059191, pp. 3 (mailed Feb. 5, 2021).

WIPO, PCT Form ISA237 Written Opinion for PCT/US2020/059191, pp. 8 (mailed Feb. 5, 2021).

WIPO, PCT Form IB326 International Preliminary Report on Patentability for PCT/US2020/059191, pp. 10 (mailed May 19, 2022).

WIPO, PCT Form ISA210 International Search Report for PCT/US2022/070747, pp. 4 (mailed Jun. 15, 2022).

WIPO, PCT Form ISA237 Written Opinion for PCT/US2022/070747, pp. 10 (mailed Jun. 15, 2022).

* cited by examiner

DATA SERVICES MODELING AND MANAGER FOR TRANSFORMATION AND CONTEXTUALIZATION OF DATA IN AUTOMATED PERFORMANCE OF WORKFLOWS

This application s a 35 U.S.C. § 111 patent application that claims the benefit of priority and is entitled to the filing date pursuant to 35 U.S.C. § 119(e) of U.S. Provisional Patent Application 63/363,000, filed Apr. 14, 2022, the content of which is hereby incorporated by reference in its entirety.

FIELD

The present invention relates to the field of performing laboratory activities and managing comprehensive, scaled laboratory workflows. Specifically, the present invention relates to systems and methods of providing and performing data services that enable scaling of all aspects of laboratory workflows, and providing a collection of application programming interfaces (APIs) that enable system connectivity, for the collection, contextualization, transformation, and persistence of data within scaled laboratory workflows.

BACKGROUND

In environments where complex workflows are performed, such as processing medical samples and performing medical tests and experiments in a laboratory setting, many different tasks may be required, and each workflow executing those tasks may involve both the use of one or more pieces of equipment as well as different samples having different testing or processing requirements. Laboratory workflows may be fully automated or include human involvement, and may be performed within a single workcell or in multiple workcells. Workflows may involve extremely complex environments where operating constraints play an important role; for example, workflows may involve handling and processing of sensitive samples and involve multiple types of labware and equipment, where characteristics such as timing of experiments, temperature ranges of the samples, and availability of labware and retrieval from storage when it is needed within such constraints plays an important role in how experiments are conducted. In such environments, there are many opportunities for adverse events such as accidents and errors to happen, and knowledge of how, why, and when such adverse events happen is crucial to improving performance of workflows. Currently, there is no solution in the existing art that provides the ability to quickly and accurately isolate data points around such adverse events to determine the causes thereof and for improving the overall operating environment.

The performance of activities, such as movement of materials and experiments, within comprehensive, scaled laboratory workflows therefore requires some orchestration for the management the many components involved in such activities. Orchestration tends to involve, at least in part, dependency management, movement of samples and consumables in the laboratory setting, and movement of data from and to external systems, as well as within the operating environment in which these laboratory workflows occur. One necessary element of such an orchestrator are therefore data services, and many approaches to data services exist that allow for transfer of information throughout large systems. However, no data services approach exists that incorporates in-depth analytics of specific event data attendant to the movement of samples and consumables in the laboratory setting, to provide explainability for events generating such event data. Additionally, there is no existing data services framework that can apply contextualized information from such explainability to enhance workflow performance, for example from improvements to ordering, scheduling, and data management across the entire platform.

Such operating environments may involve the use of orchestration software to manage processes involved in workflows. Orchestration generates voluminous datasets related to such dependency management and movement of samples and labware. However, there is no currently available approach that models such datasets to extract and understand events happening within the operating environment to ensure that each operation is executed correctly, on time, and efficiently.

Accordingly, there is a need in the existing art for analyzing event data, and modeling state changes in events within laboratory workflow cycles, in a comprehensive data services framework. There is also a need in the existing art for data processing tools that enable contextualization of event data to explain state changes in events, and further to apply contextualized event data to execute activities that improve the performance of workflow cycles. There is a further need in the existing art for data services within orchestration software for managing movement of data across an environment in which comprehensive, scaled laboratory workflows are performed.

SUMMARY

The present invention provides an approach for modeling state changes in events occurring within laboratory workflows. This approach is performed in one or more systems and methods that analyze event data representing both inputs and outputs (and dependencies thereof) from, of, or related to operations within such laboratory workflows. This information is processed to identify and explain why state changes in the events occur, by isolating the activities producing such state changes to re-create events, and provide contextualization to the event data at one or more time periods during workflow cycles. The present invention also publishes messages having a payload representing contextualized event data for subscription within an orchestrator environment to execute and perform one or more laboratory activities relative to the workflow cycle. The present invention is therefore a data services tool that applies computational and/or mathematical processes to provide context and explainability to events, particularly where such events involve errors, accidents, or otherwise result in sub-optimal outcomes.

The approach of the present invention is embodied in a data services modeling framework for contextualizing events from state changes and for orchestrating laboratory activities attendant to the performance of workflow cycles. The data services modeling framework forms a part of a data services module within an orchestrator software package that provides a set of dynamic processes that enable reaction to unforeseen events that may happen within laboratory workflows and workflow cycles, and for improving workflow performance. Nonetheless, it is to be understood that the data services modeling framework of the present invention is applicable in any environment in which analyzing changes in event states and contextualizing event data within complex workflows can improve performance aspects thereof.

Data services generally, and the data services modeling framework of the present invention that performs these data services, facilitates this orchestration, and enables data and workflow integration that yields multiple benefits, such as throughput optimization of manual, semi-automated, and fully automated processes, improved sample tracking and traceability, integration of process and sample data, and error reduction. It also yields improvements in robotic automation and integration, such as continuous operation, consistency, throughput increase without corresponding headcount increases. Still further, data services improves material handling, transportation, and logistics optimization, which realizes benefits in inventory management, automated ordering, just-in-time delivery, materials and sample flow between stations or workcells, improvements in both sample re-run workflows and sample and consumable storage in retrieval. Data services also yields improvements in data visualization and operational insights, from monitoring performance of processes in real time, monitoring of sample throughput and velocity, bottleneck discovery, and in capacity planning.

An orchestrator environment within which the data services modeling framework is embodied is a software package that provides a comprehensive laboratory workflow management solution designed to automate entire end-to-end lab workflows. The orchestrator environment performs functions such as planning, executing, scheduling, and optimizing the overall processes and workflows in a laboratory setting, at least in part by managing the movement of the materials, and capturing and contextualizing of data relative to this movement of materials.

The orchestrator software package includes multiple modules or elements that perform specific functions within the orchestrator environment. In addition to providing data services, other modules or elements include a workflow designer, a workflow conductor, a transportation manager, one or more user interface modules providing functions such as a dashboard-style visualization of information, and a scheduler. The orchestrator software package may also be implemented a series of building blocks, allowing for add-on of modules and elements, and their attendant functions, as needed. Together, all of these enable management of processes both on a workstation level, and at a larger level, for example, at a factory level, so that the orchestrator software package enables scalability with the entire laboratory workflow in mind. The orchestrator software package may be cloud-based or locally implemented, and reaches beyond a single laboratory by monitoring multiple laboratories in single campus locations, or multiple laboratories around the world.

It is therefore one objective of the present invention to provide a system and method for analyzing event data, and modeling state changes within events within laboratory workflows. It is also an objective of the present invention to provide a system and method for providing a data services modeling framework that analyzes event data and models state changes within events, within a broader orchestrator environment. It is another objective of the present invention to implement an approach for contextualizing event data to explain state changes in events, and applying contextualized event data to execute and perform one or more laboratory activities relative to workflow cycles. It is yet another objective of the present invention to provide a system and method of performing data services generally within an orchestrator environment to manage the movement of information and materials, and managing the capture, processing, and contextualizing of data within such an environment. It is still another objective to provide a system and method for providing a framework for data services management for applications not involving laboratory workflows and outside the field of life sciences, such as packaging and shipping of consumer goods, facilitating safe and effective human transportation, and managing the manufacturing of highly complex, multi-part industrial products.

Other objects, embodiments, features and advantages of the present invention will become apparent from the following description of the embodiments, taken together with the accompanying drawings, which illustrate, by way of example, the principles of the invention.

BRIEF DESCRIPTION OF THE DRAWINGS

The accompanying drawings, which are incorporated in and constitute a part of this specification, illustrate aspects of the disclosed subject matter in at least one of its exemplary embodiments, which are further defined in detail in the following description. Features, elements, and aspects of the disclosure are referenced by numerals with like numerals in different drawings representing the same, equivalent, or similar features, elements, or aspects, in accordance with one or more embodiments. The drawings are not necessarily to scale, emphasis instead being placed upon illustrating the principles herein described and provided by exemplary embodiments of the invention. In such drawings.

DETAILED DESCRIPTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

In a laboratory setting where complex tasks and experiments are conducted, a workflow may be considered as one or more steps in performing a process, while a workcell may be considered as one or more devices, and/or locations, for performing a task or tasks within a workflow. Workflows may comprise, and be performed in, one or more workflow cycles, and workcells may therefore be considered as an integration of equipment for performing one or more of such tasks within such workflow cycles. Both workflows and workcells may be defined and constrained by both temporal and spatial characteristics and requirements. In such a laboratory setting, a workflow may be characterized as process-level, whereas a workcell may be characterized as device-level within the workflow, as well as spatio-temporal. Regardless, events occurring in relation to workflows, workflow cycles, and workcells often require contextualization so that planning, scheduling, and execution for the entire laboratory can be harmonized in a single orchestrator environment. Such contextualization also enables both predictions and forecasts of event states within laboratory processes to improve workflow performance.

Data Services Modeling Framework

Figure 1:
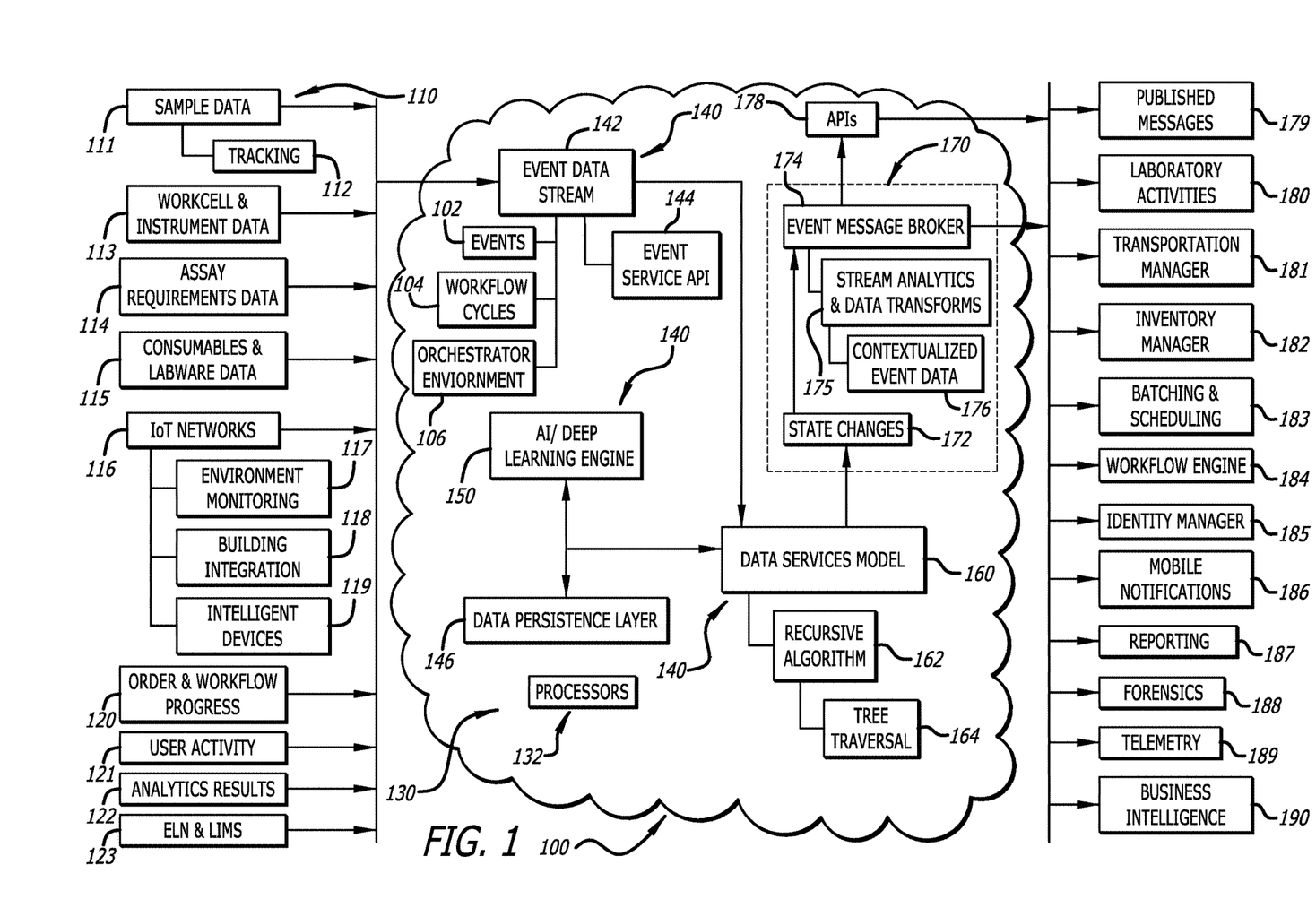
FIG. 1 is a system diagram for a data services modeling framework for contextualizing an event state in the performance of laboratory workflows, according to the present invention.

FIG. 1 is a system diagram of a data services modeling framework 100 for contextualizing events 102 and states thereof in laboratory workflow cycles 104, and for orchestrating laboratory activities 180 attendant to such workflow cycles 104, according to the present invention. The data services modeling framework 100 of the present invention is performed within one or more systems and/or methods, that include several processing elements each of which define distinct data services functions involved in analyzing input data in the form of event data 110 to model state changes 172 in one or more events 102 occurring within workflow cycles 104, and contextualizes and explains these state changes 172. The data services modeling framework 100 publishes messages 179 and provides these contextualized, explained state changes 172, and enables subscription to messages 179 for executing and performing various activities 180 in the performance of workflows cycles 104 that involve multiple tasks and experiments, both within an orchestrator environment 106 and external to such orchestrator environment 106.

Event data 110 is provided to a plurality of data processing elements 140 in the data services modeling framework 100 that are components within a computing environment 130 that also includes one or more processors 132 and a plurality of software and hardware components. The one or more processors 132 and plurality of software and hardware components are configured to execute program instructions or routines to perform the algorithms comprising the data processing functions described herein, and embodied within the plurality of data processing elements 140.

The plurality of data processing elements 140 include a data collection and initialization element that receives, ingests, requests, or otherwise obtains event data 110 relative to various aspects in the performance of workflow cycles, through an event service API 144 that provides such event data 110 in one or more event data streams 142. The event service API 144 provides an endpoint for any data source (for example, a service, a device, an instrument, a sensor, etc.) to publish data in the one or more event streams 142. All data published through such an endpoint is attributed with and aggregates extensive metadata that provides rich context and association for each type of event data 110. Orchestration using systems and methods such as those provided by the data services modeling framework 100 within the broader orchestrator environment 106 is primarily centered around dependency management and movement of data, as well as samples and consumables in the laboratory, to ensure that each workflow cycle is executed correctly, on time, and efficiently.

The data collection and initialization element and associated event data streams 142 may also initialize the event data 110 and the data services modeling framework 100. This may include, at the outset, identifying at least one event 102 within a workflow cycle 104 for analysis from the content of the event data 110, and configuring the various components involved in processing the event data 110 within the framework 100, to analyze the at least one event 102 identified therein. The data services modeling framework 100 may automatically identify the at least one event 102, and/or an associated workflow cycle 104, from the metadata associated with the event data 102, for example by searching for and extracting such information from the event data 110 itself. Alternatively, a user may provide such information, for example by manually entering it using a support tool as discussed further herein. Regardless, the data services modeling framework 100 may be configured to be initialized by, at least in part, identifying an event 102 within a workflow cycle 104 for contextualization. Still further, the at least one event 102 may be defined from the incoming event data 110 according to pre-defined and yet composable rules, such that a set of pre-defined rules may be utilized to identify the at least one event 102, or such that a user may be able to add custom rules or enter custom workflow cycles 104 that enable identification of the at least one event 102 for which analysis is required.

Still referring to FIG. 1, event data 110 may include numerous types of information that represent both inputs and outputs (and dependencies thereof) from or of operations within workflow cycles 104. Event data 110 may include sample data 111, such as information representing one or more of identity, volume, concentration, condition, storage, safety, and processing environment requirements, as well as sample constraints. Such information defines conditions at least for tracking 112 of samples, such as for example that the sample must be available in compatible labware, and in sufficient volume, format, and concentration, etc., and must be transported on time and stored in the correct or authorized location and according to particular protocols.

Event data 110 may also include workcell and instrument data 113 that define conditions such as capabilities, configurations, limits, constraints, and status of both workcells and instruments being used in a workcell or during a workflow cycle 104. This may include activity information and utilization information, such as for example how often and for how long particular instruments have been used. Event data 110 may also include assay requirements data 114 that define timing, acceptable deviations, and consumables and reagent requirements for assays performed in a workflow cycle 104. It is to be understood that many examples of workcell and instrument data 113 and assay requirements data 114 are possible and within the scope of the present invention, and therefore neither this disclosure nor the claims are to be limited to any particular type of such data mentioned herein.

Event data 110 may also include consumables and labware data 115. For example, this information may include reagent data, such as that reagents must be available in sufficient quantities, be unexpired, and be setup correctly using specific labware such as authorized dispensers and liquid handlers, and under correct environmental conditions. Consumables and labware data 115 may also specify the correct quantity of available labware, and may specify the type of empty labware that must be available for workflow cycles 104, and indicate specific conditions for such labware, such as that it be loaded into the correct storage locations, and that seal types must be compatible with other labware that needs to be sealed. As with other types of event data 110, many examples of consumables and labware data 115 are possible and within the scope of the present invention, and therefore neither this disclosure nor the claims are to be limited to any particular type of consumables and labware data 115 mentioned herein.

Many other types of event data 110 are also possible, and within the scope of the present invention. For example, event data 110 may also include data collected from an Internet-of-Things (IoT) network 116, which may provide information that includes environmental monitoring 117, building integration 118, and status and characteristics of intelligent devices 119 within a laboratory setting. Such data may be provided by one or more IoT sensors that are associated with one or more of an area, a building, a structure, a portal, a device, or any other physical item within an IoT network 116. Event data 110 may also include order and workflow progress data 120, user activity 121, analytics results 122 from prior analyses of aspects of workflow cycles 104 (for example, as a feedback loop of the data services modeling framework 100), and data from the third-party sources such as electronic laboratory notebooks (ELNs) and laboratory information management systems (LIMS) 123.

As shown in FIG. 1, data services modeling framework 100 may ingest event data 110 from such ELNs and LIMS 123, and also enable write functions to third party systems such as ELNs and LIMS 123. For example, every event 102 and every event-related item (such as tasks, processes, samples, consumables, and labware) that is captured within the orchestrator environment 106 may be made available to an ELN or a LIMS 123, or both. A query service application programming interface (API) 178 may be included among the APIs 178 as discussed below, configured to provide an interface for both internal systems and external systems to query event data 110 and perform read and write functions from and to ELNs and LIMS 123.

The plurality of data processing elements 140 also includes a data persistence layer 146 that serves as a data lake within which all data needed for processing within the data services modeling framework 100 is maintained. The data persistence layer 146 may be one or more database collections that store and maintain such data, and may include historical data and any persistent information that is not included within event data 110. The data persistence layer 146 may also be used to store event data 110 that is ingested into the data services modeling framework 100 prior to processing within others of the plurality of data processing elements 140 within the data services modeling framework 100.

The plurality of data processing elements 140 further includes a data services model 160, which is configured to perform one or more computational processes, mathematical analyses and/or algorithmic functions that together model the event data 110 to define state changes 172 that contextualize and explain an event state at one or more time periods in the workflow cycle 104.

Referring to FIG. 1, once the data services modeling framework 100 has identified at least one event 102 within a workflow cycle 104 for analysis, the one or more computational processes, mathematical analyses and/or algorithmic functions are executed by the data services model 160. These include a recursive algorithm 162 that is configured to query at least one node within a data structure representing the workflow cycle 104, by searching temporal slices relative to the at least one node by activities associated with a state of the at least one event 102. The data services model 160 then extracts data points describing the state of the at least one event 192 at the temporal slices, and contrasts the data points to define the one or more state changes 172 in the at least one event 102 at each node.

Querying a data structure representing the workflow cycle 104 is a form of tree traversal 164, which is a process involving visiting (e.g. retrieving, updating, or deleting) each node in a tree data structure. Such traversals may be classified by the order in which the nodes are visited; traversing a tree involves iterating over the nodes in some manner. Recursive querying is employed because from any given node there may be more than one possible next node as it is not a linear data structure, and therefore, in tree traversal some nodes are deferred assuming sequential, non-parallel computation. In such a case, deferred nodes are stored in some way for later visiting. As a tree is a self-referential (recursively defined) data structure, traversal can be defined by recursion or, more subtly, co-recursion, where the deferred nodes are stored implicitly in a stack to be queried when called.

As shown in FIG. 1, the one or more computational processes, mathematical analyses and/or algorithmic functions that are executed by the data services model 160 also include one or more real-time data analytics and transforms 175, which are additional elements configured to explain the one or more state changes 172 in the at least one event 102, for example by converting raw data into standardized data. The one or more real-time data analytics and transforms 175 then utilizes the standardized data to isolate the activities producing the one or more state changes 172, to re-create the state of the at least one event 102, expressed for example in a newly written data structure comprised of one or more nodes. The data points defining the one or more state changes 172 are then added to the data structure representing the re-created state. This results in contextualization of the event state at one or more time periods in the workflow cycle 104 to explain the one or more state changes 172.

The data services model 160 may execute these computational processes and mathematical analyses functions within an event message broker 174 that is configured to perform additional functions within the data services modeling framework 100, and provide additional information for follow-on, output-specific elements that perform such functions. For example, the event message broker 174 is configured to take incoming messages and publish one or more messages 179 for subscription to the orchestrator environment 106 to execute and perform one or more activities 180 relative to the workflow cycle 104, where each message includes a payload that at least represents contextualized event data 176. The event message broker 174 may also be configured to enable create a schedule for executing and performing additional activities in the workflow cycle 104 in response to the one or more messages 179, for example in a batching and scheduling manager 183.

The event message broker 174 acts as both a subscriber of raw, incoming messages, and a publisher of standardized data for subscription within the orchestrator environment. The event message broker 174 is therefore a publisher-subscriber system that allows internal and external components within the orchestrator environment to subscribe to event messages, and re-publish new messages, and is the mechanism within which the one or more real-time data analytics and transforms 175 are performed. The event message broker 174 also acts as a messaging bus that organizes messages, manages subscribers, and executes the one or more real-time data analytics and transforms 175 to convert and prepare messages for subscription. The event message broker 174 takes state changes 172 analyzed by the data services model 160, and performs the one or more real-time data analytics and transforms 175 to generate the one or more messages 179 that represent the contextualized event data 176. The functions performed by the event message broker 174 may therefore also represent output data 170 of the data services modeling framework 100.

API Manager

As shown in FIG. 1, access to the data services modeling framework 100 may be provided through one or more application programming interfaces (APIs) 178. The present invention contemplates that many layers of APIs 178 may be utilized within the data services modeling framework 100, for example to enable registration of workflow components such as samples, labware, instruments, automated stations or robots, manual stations, or workcells, ingestion of particular forms of event data 110, or customized uses of the output data 170. One layer of APIs 178 may be utilized to connect feeds of event data 110 with the data services modeling framework 100 itself, and different APIs 178 may be provided for each type of event data 110, for example where different types of event data 110 have different formats and content, or are ingested from different sources. APIs 178 may be managed by an API manager specifically configured for each implementation thereof, for example as the event service API 144.

A further layer of APIs may be utilized to ingest certain information for specific portions of the deep learning engine 150. For example, the data services modeling framework 100 may retrieve historical information via an API 178 that provides this information directly to the processing performed by one or more neural networks within the deep learning engine 150, and extracts information from such historical data for further analytics in the various data processing elements 144 of the data services modeling framework 100.

APIs 178 may also be utilized to enable published messages 179 within the output data 170 of the data services modeling framework 100, and APIs 178 may be developed to enable the follow-on forms of the output data 170 that are discussed above. Third parties may utilize such APIs 178 to develop their own, follow-on uses of the output data 170, such as to generate and export customized reports, comply with regulatory requirements, generate recommendations, risk assessments, or alerts, or develop their own enterprise-specific applications. APIs 178 may also be provided to enable customized interfaces via a support tool, also as described further herein.

Specific APIs 178 may be included for specific functions within the data services modeling framework 100 and a broader orchestrator environment 106. Such specific APIs 178 may be included to integrate subscription to published messages 179, and responses thereto, by processing messages published back from the orchestrator environment 106. For example, the data services modeling framework 100 may include a transportation API configured to provide an interface for fulfillment of transportation requests, and an accessioning service API configured to provide an interface for registering events, and for creating and associating event identifiers and event types with registered events. Still further, the data services modeling framework 100 may include an inventory API configured to manage inventory activities such as ordering, storage, and scheduling, and a query service API configured to provide an interface for both internal systems and external systems to query event data 110.

Output Data

Referring to FIG. 1, output data 170 of the data services modeling framework 100 represents contextualized event data 176, and may be embodied as instructions to execute and perform one or more activities 180, as well as many other forms. For example, output data 170 may be instructions to subscribe to messages 179 to systems or devices, either internal or external to the orchestrator environment 106, to take an appropriate action or provide an appropriate response pertaining to an event 102 or workflow cycle 104. Such instructions may be provided as part of a data stream as in FIG. 3, to which systems or devices may subscribe for taking such actions or providing such responses. Such instructions may also be included within the one or more messages 179.

The systems and devices are responsible for laboratory activities 180 may include a transportation manager 181, configured to initiate, adjust, or terminate movement of one or more devices (such as a robot, or component of a robot) or a workcell (or component of a workcell) during a workflow cycle 104. The transportation manager 181 may subscribe to the one or more published messages 179, for example via a transportation-specific API 178 as noted herein, for creating, assigning, monitoring, and managing the transportation of items within a workflow cycle 104. Messages 179 provided to the transportation manager 181 may include instructions, for example, for managing material handling logistics and for automated or manual fulfillment of transportation requests.

They may also include an inventory manager 182, configured to manage handling of item inventories within a workflow cycle 104. Such an inventory manager 182 may subscribe to the one or more published messages 179 via one or more inventory-specific APIs 178, and may be utilized to monitor inventory levels for consumables and labware. The inventory manager 182 may be configured with rules, for example defining minimum stock levels at any storage location and triggering setup to request resupply or reordering. Such tasks may be accomplished either through direct integration between purchasing systems (for example, through an inventory-specific API 178, or via messaging or email notifications) and the inventory manager 182 of the data services modeling framework 100. One or more applications may also be included, for example through a support tool as described further herein, to enable management of check-in and removal items of items from storage locations along with other inventory tasks. Inventory management may include both serialized inventory (samples, compounds, instruments, etc.) and non-serialized inventory (empty labware, consumables, etc.); where inventory is serialized, any item can be located hierarchically (for example, as sample—tube—rack—shelf—freezer—lab—building—organization) along with an entire location and transport history, and where the inventory is non-serialized, inventory may be managed for example based on location, whether it was checked in/out, and whether it was consumed. Non-serialized inventory may be managed via an inventory level trigger-based reordering system that may be integrated with automated procurement systems, or used to automatically notify procurement or operations for purchasing or redistribution.

Output data 170 may also be embodied as instructions provided to a batching and scheduling manager 183 that is configured to perform batch processing of items within workflow cycles 104 or create a schedule one or more tasks to be performed as part of workflow cycles 104, or one or more additional laboratory activities that comprise such tasks. The batching and scheduling manager 183 is a collection of composable batching and scheduling engines that operate based on instructions to optimize when and how orders are executed for workflows. Batching engines may be configured with custom logic rules that allow multiple orders to be combined together for execution in order to optimize throughput. Composable scheduling engines provide customization options for how resources are allocated to orders and how those orders are scheduled over time. This allows for custom rules to define how orders are prioritized and how conservative or aggressive scheduling optimization should be, and also provides for dynamic rescheduling of queued orders to occur in response to real time events, for example to reschedule future steps in response to feedback on timing overruns, instrument errors, or cancelations.

Output data 170 may also be embodied as instructions provided to a workflow engine 184, configured for example to execute orders or instructions for a workflow or workflow cycle 104 that are generated within the orchestrator environment 106 or any third-party software interacting with the orchestrator environment 106, for example via a specific order service API 178. Workflows may be designed using a workflow designer, and operate across any instrument, manual station, or workcell registered with the data services modeling framework 100. Regardless, output data 170 may be provided to such a workflow engine 184 to perform multiple tasks associated with configuring workflows and/or workflow cycles and for carrying out those tasks.

Other systems or devices receiving output data 170 may include an identity manager 185. The identity manager 185 integrates with identity providers, such as LIMS, asset management databases, active directories, etc., to provide information on the identity of samples, labware, instruments, users, etc. The contextualized event data 176 generated by the data services modeling framework 100 may include information related to the identity of one or more of samples, labware, instruments, users, and many other aspects of a workflow, and the messages 179 published within the output data 170 may be provided to the identity manager 185 via one or more specific APIs 178 as a gateway to the types of identity providers listed herein.

The identity manager 185 may include one or more adaptors for each identity provider. For example, one or more LIMs adaptors may be included, which are plugins for contextualized event data 176 that adapt that information to or from an existing LIMS system. This allows a batching or scheduling manager 183, workflow engine 184, or other system to query information about samples, labware, etc. in a uniform way, regardless of what specific LIMS system is employed. In addition, such a LIMS adaptor monitors for the occurrence of events such as liquid transfers, sample weighing, container taring, etc. and updates the external LIMS accordingly.

The output data 170 may further be applied for generating and transmitting mobile notifications 186, and provided for presentation functions such as reporting 187, forensic analysis 188, telemetry 189, and business intelligence 190. A telemetry 189 function records and transmits data such as readings of instruments within a laboratory experiment, for example as a payload in the one or more messages 179. The output data 170 may also be provided for custom dashboard uses, search functions, and many other presentation functions that may be developed as follow-on applications or use cases.

Support Tool

As shown in FIG. 1, output data 170 may, in one embodiment of the present invention, also be applied to a support tool which may be utilized to configure one or more aspects of the data services modeling framework 100. For example, the support tool may allow users to adjust certain aspects of the deep learning engine 150 and the data services model 160, such as any weights or coefficients that applied to variables within the algorithms applied therein. The support tool may also be utilized to view and utilize the output data 170 as needed for execution and/or adjustment of workflows and workflow cycles 104, or as needed by users.

Various aspects of the data services modeling framework 100 may be configured in a number of ways using the support tool. For example, particular aspects of data services may be initialized by a user via the support tool, such as via an application resident on a computing device and/or using a graphical user interface. The user may select a specific laboratory process for analysis, and configure various aspects of the analysis performed for the specific laboratory process, such as by defining temporal ranges, selecting s type of process, identifying labware and samples, inputting custom labware and sample specifications, and defining parameters or ranges such as temperature limitations, for example to isolate particular events occurring during a specific laboratory process within a workflow cycle 104. Users may also be able to enter or adjust specific parameters representing analytics in the deep learning engine 150 and/or the data services modeling 160, as well as enter or adjust weights or coefficients that are applied to such parameters or variables as noted above. The support tool also includes capabilities that allows for user interaction via widgets, drop-down menus, and other indicia presented via a graphical user interface that allow a user to make selections and perform functions attendant to operation of the data services modeling framework 100.

Machine Learning Engine

Referring to FIG. 1, the plurality of data processing elements 140 may be performed in conjunction with machine learning algorithms, by applying a deep learning engine 150 representing one or more layers of artificial intelligence to further simulate and model outcomes for analyzing state changes 172 in events 102 and workflow cycles 104, and developing contextualized event data 176. The deep learning engine 150 is utilized to improve an understanding of event data 110 by examining the reasons for prior, known state changes 172 to identify and predict future state changes 172 in events 102 based on those outcomes. The deep learning engine 150 may, in one embodiment of the present invention, be comprised of one or more algorithms that apply techniques of supervised learning, reinforced learning, and other approaches of machine learning to further evaluate event data 110 to develop and apply the data services model 160, and increase its accuracy, and generate more accurate assessments of state changes 172 by analyzing the prior, known reasons producing similar state changes for prior events 102 in prior workflow cycles 104.

The machine learning algorithms applied by the deep learning engine 150 may be include one or more neural networks that are instantiated to further perform this further analysis of state changes 172 in events 102 to improve the performance of the data services model 160 generally. Neural networks generally are comprised of nodes, which are computational units having one or more biased input/output connections. Such biased connections act as transfer (or activation) functions that combine inputs and outputs in some way. Nodes are organized into multiple layers that form a neural network. There are many types of neural networks, which are computing systems that "learn" to perform tasks, such as modeling configuration schemes and pathway topologies, and selecting appropriate schemes and topologies, without being programmed with task-specific rules, based on examples.

Neural networks generally are based on arrays of connected, aggregated nodes (or, "neurons") that transmit signals to each other in the multiple layers over the biased input/output connections. Connections, as noted above, are activation or transfer functions which "fire" these nodes and combine inputs according to computational processes and mathematical equations or formulas. Different types of neural networks generally have different configurations of these layers of connected, aggregated nodes, but they can generally be described as an input layer, a middle or 'hidden' layer, and an output layer. These layers may perform different transformations on their various inputs, using different computational processes and mathematical calculations or functions. Signals travel between these layers, from the input layer to the output layer via the middle layer, and may traverse layers, and nodes, multiple times.

Signals are transmitted between nodes over connections, and the output of each node is calculated in a non-linear function that sums all of the inputs to that node. Weight matrices and biases are typically applied to each node, and each connection, and these weights and biases are adjusted as the neural network processes inputs and transmits them across the nodes and connections. These weights represent increases or decreases in the strength of a signal at a particular connection. Additionally, nodes may have a threshold, such that a signal is sent only if the aggregated output at that node crosses that threshold. Weights generally represent how long an activation function takes, while biases represent when, in time, such a function starts; together, they help gradients minimize over time. At least in the case of weights, they can be initialized and change (i.e. decay) over time, as a system learns what weights should be, and how they should be adjusted, for example due to data points describing the state of the event 102 being analyze at relevant temporal slices. In other words, neural networks evolve as they learn, and the computational processes and mathematical formulas and functions that comprise neural networks design can change over time as a system improves itself.

Neural networks instantiated as part of the machine learning engine 150 may be particularly applicable in the data services model 160 of the framework 100 where modeling of spatial and temporal characteristics related to events 102 involve determining and assigning weights for evaluating activities associated with a state of an event 102, and isolating the activities producing changes in state to re-create the state of the at least one event 102. Neural networks may therefore be useful within the data services model 160 to re-create the state more accurately, particularly at or near temporal periods where state changes occur, with emphasis on data points associated with changes in the state to contextualize that state at relevant time periods in the workflow cycle 104. For example, a neural network trained on historical time records representing how long a robot needs to transfer a plate may improve the resulting processing required to correctly assess deviations in plate transfers identified during the tree traversal 164. Using neural networks in such a situation may enable the data services model 160 to produce faster and more accurate outputs, and publish messages indicative of a need to address a particular issue. This may be particularly important where time-sensitive situations require a fast and accurate response during a workflow cycle 104.

Event State Contextualization Progress

Figure 2:
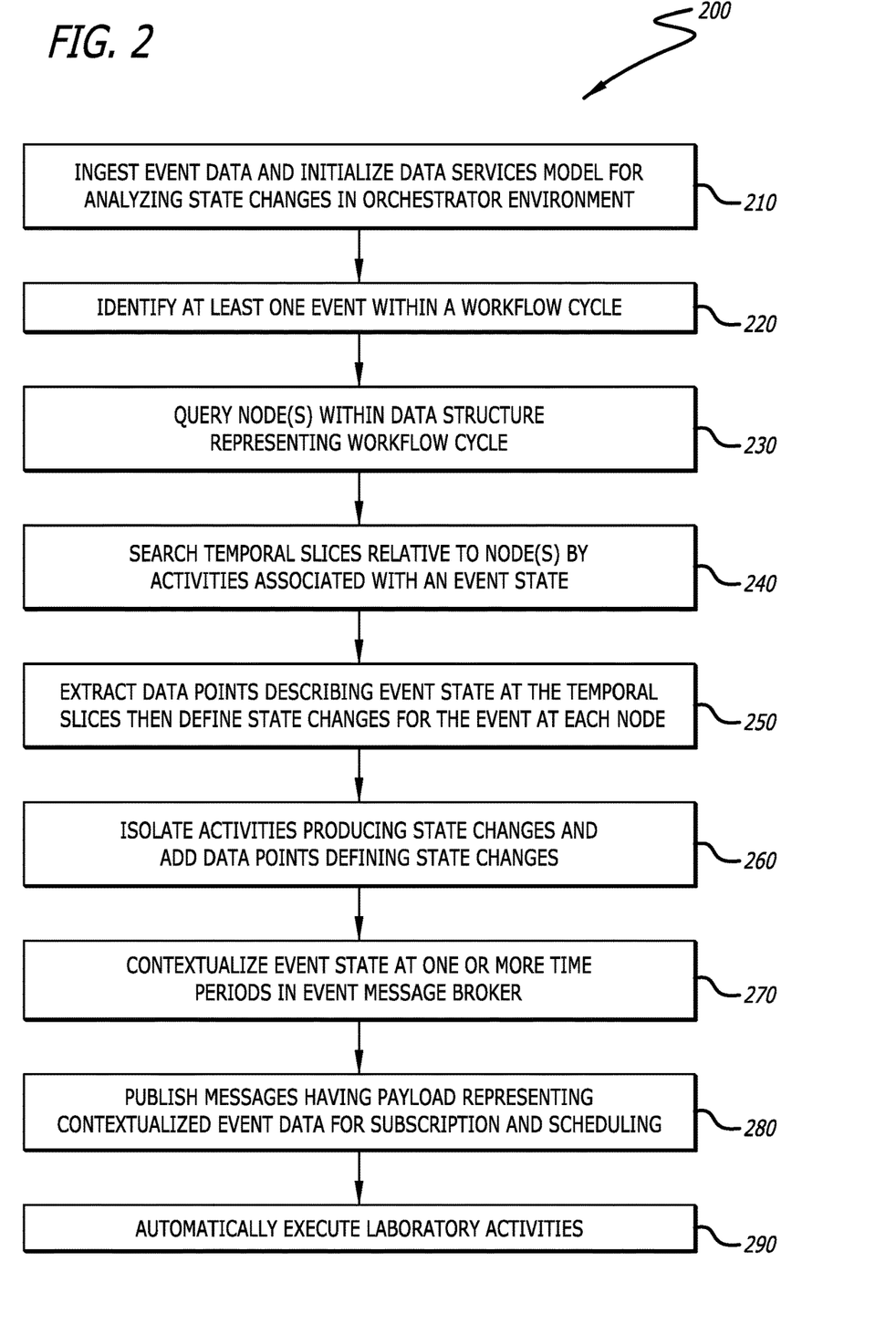
FIG. 2 is a flowchart of steps performed in a process for contextualizing an event state in the performance of laboratory workflows, according to the present invention.

FIG. 2 is a flowchart of steps performed in a process 200 for contextualizing an event state in a performance of laboratory workflows, according to the present invention. Such a process 200, and the associated data services model 160, is initialized at step 210 by ingesting event data 110 from one or more sources as described above, within an event data stream 142 to event message broker 174. The process 200 represents one or more steps involved in analyzing state changes 172 within an orchestrator environment 106 within the event message broker 174. The initialization of the process 200 at step 210 may also include registering workflow components such as those elements identified within event data 110. At step 220, the initialization process 200 may further include identifying at least one event 102 within a workflow cycle 104 for analysis of state changes 172 therein within the event message broker 174.

At step 230, the process 200 continues by application of the data services model 160, which involves recursively querying one or more nodes within a data structure that represents a workflow cycle 104. This involves application of a recursive algorithm 162 in a traversal 164 of the tree embodying the data structure, and at step 240, searching temporal slices relative to each node by activities associated with an event state. At step 250, the process 200 extract data points that describe the event state at the temporal slices, and these are contrasted to define one or more state changes 172 in the event 102 at each node.

At step 260, the process 200 isolates specific activities that produce the state changes 172, and records any data points that are descriptive of the state changes 172. This generates a set of contextualized event data 176 representing a contextualized event state at one or more time periods that reflect the state changes 172 at step 270. At step 280, the process 200 publishes messages 179 from the event message broker 174 having a payload comprised at least of the contextualized event state data 176. These messages 179 are published to by the event message broker 174 for subscription and for executing and performing laboratory activities 180 at step 290, in follow-on actions that include scheduling, ordering, transportation, writing to external systems, and workflow design.

Dynamic Unforeseen Event Processes

Figure 3:
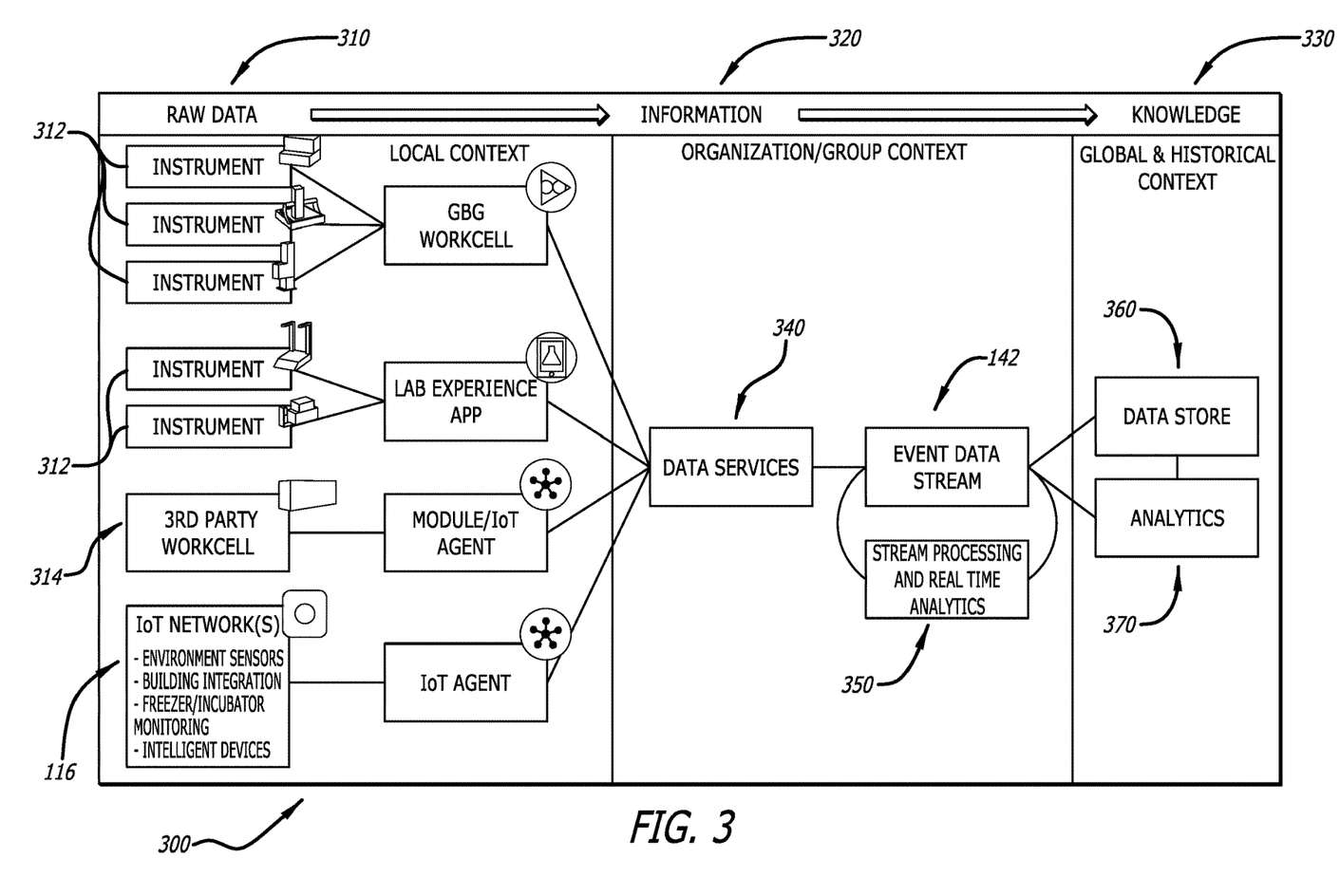
FIG. 3 is a diagram illustrating contextualization performed by a data services modeling framework within an orchestrator environment, according to the present invention.

Referring now to FIG. 3, the data services aspect of the orchestrator software package provides a set of dynamic processes that enable reaction to unforeseen events that may happen within laboratory workflows and workflow cycles 104. Orchestration is primarily centered around dependency management and the movement of samples and consumables in a lab setting, and data attendant to that dependency movement, to ensure that each operation is executed correctly, on time, and efficiently. Data services 340, such as illustrated in FIG. 3, is the end-to-end management of data within an orchestrator environment 106, and drives the production of event data 110 in the one or more event data streams 142 that are analyzed within the data services modeling framework 100 of the present invention.

FIG. 3 is a diagram illustrating the contextualization function of the data services aspect within an orchestrator environment 106 performed by a data services modeling framework 100, according to one aspect of the present invention. FIG. 3 illustrates a continuum of data transforms 300 within the event message broker 174 of the data services modeling framework 100, and how the event message broker 174 operates with respect to contextualized event data 176. FIG. 3 illustrates data services 340 performed by the event message broker 174 within the context of an orchestrator environment 106.

Referring to FIG. 3, event data 110 is collected from different sources as raw data 310. These sources may include instruments 312, workcells or third-party sources (which also include third-party instruments) 314, and IoT networks 116, such as sensors coupled to intelligent or smart devices, and other sources such as environmental sensors, building-related sensors that monitor integration of surrounding infrastructure, and sensors that monitor characteristics of specific equipment such as freezers or incubators. In a local context, some instruments 312 providing raw data are part of workcells involved in one or more workflow cycles 104 within the orchestrator environment 106, while others are part of applications involved in such workflow cycles 104 attendant to laboratory experience. Still others, such as third party workcells 314 or other third-party instruments, provide raw data 310 through specific modules or agents, such as IoT agents. Regardless, all of these sources of raw data 310 provide information 320 for data services 340 from a local context to a broader organizational, group context. Data services 340 involve the application of data processing elements 140 (represented as shown in FIG. 3) on an event stream 142 representing the event data 110 provided as raw data 310, comprised of stream processing and real-time analytics 350 that at least include the deep learning engine 150 the data services model 160. The processing of this information 320 is then provided and stored as knowledge 330, within a data store 360, and for further analytics 370. This knowledge 330 may maintained as part of the data persistence layer 146 and accessed therefrom, which may include the data store 360.

Other Use Cases and Back to the Future

It is to be understood that the data services modeling framework 100 of the present invention is applicable in any environment in which analyzing changes in event states and contextualizing event data within complex workflows can improve performance aspects thereof, and therefore the scope of neither this specification nor the attached claims are to be limited to any particular setting in which such a framework is specifically mentioned. The data services functions of the orchestrator environment 106, within which the data services modeling framework 100 is embodied, may be utilized for example in many applications not involving laboratory workflows, and outside the field of life sciences. Examples of such non-life sciences applications include, but are not in any way limited to, packaging and shipping of consumer goods, facilitating safe and effective human transportation, and managing the manufacturing of highly complex, multi-part industrial products such as heavy machinery, airplanes, automobiles, rolling stock, and commercial ships.

Similarly, event data 110 need not be confined to information that represent inputs and outputs (and dependencies thereof) from, of or related to operations within workflow cycles 104 in a laboratory setting, such as sample data, assay requirements data, and consumables and labware data. Instead, event data 110 may be information representing inputs and outputs for robotic equipment involved in manufacturing large-scale commercial products having many different parts, or handling and moving packages in large warehouses. Still further, event data 110 need not involve robotic equipment at all. Instead, it may represent events for, and the present invention may be configured to, analyzing performance of hardware devices and software elements across many different fields, such as for example generating and distributing electricity, large scale loading and unloading of commercial goods (such as in port environments), and monitoring the performance and maintenance of fleets of vehicles, ships, airplanes, trains, etc. Regardless of the use case, it is to be understood that the data services functions embodied in the data services functions of the orchestrator environment 106, and within which the data services modeling framework 100 is embodied, have wide utility across many different types of applications where workflow cycles 104 are performed, and for which data analytics in diagnosing issues within such workflow cycles 104 can help to improve and/or enhance workflow performance.

Aspects of the present specification can also be described by the following embodiments:

1. A method of contextualizing an event state in a performance of laboratory workflows, comprising: ingesting, within an orchestrator environment for managing a plurality of laboratory workflows, event data that includes one or more of sample data, workcell and instrument data, assay requirements data, and consumables and labware data; modeling one or more state changes in the event data, by identifying at least one event within a workflow cycle, recursively querying at least one node within a data structure representing the workflow cycle by searching temporal slices relative to the at least one node by activities associated with a state of the at least one event, extracting data points describing the state of the at least one event at the temporal slices, and contrasting the data points to define one or more state changes in the at least one event at each node, and explaining the one or more state changes in the at least one event, by isolating the activities producing the one or more state changes to re-create the state of the at least one event, and adding the data points defining the one or more state changes to contextualize the state of the at least one event at one or more time periods in the workflow cycle; publishing one or more messages having a payload representing contextualized event data for subscription to the orchestrator environment; and automatically executing one or more laboratory activities relative to the workflow in response to the one or more messages.

2. The method of embodiment 1, wherein the one or more messages include instructions for the automatically executing the one or more laboratory activities.

3. The method of any one of embodiments 1-3, further comprising generating a schedule of additional laboratory activities in the workflow cycle, in response to the one or more messages, and automatically executing the additional laboratory activities according to the schedule.

4. The method of any one of embodiments 1-4, wherein the orchestrator environment is a data management platform for integrating a performance of the plurality of laboratory workflows, the orchestrator environment including one or more of an order manager, a transportation manager, a data services manager, a scheduler, an IoT agent, and a workflow manager.

5. The method of embodiment 4, wherein the one or more messages are published within an application programming interface environment that integrates the subscription to the one or more messages and responses to the one or more messages, by processing messages published back from the orchestrator environment.

6. The method of embodiment 5, wherein the application programming interface environment includes one or more transportation APIs configured to provide an interface for fulfillment of transportation requests during performance of the one or more workflows.

7. The method of embodiment 5, wherein the application programming interface environment includes an accessioning service API configured to provide an interface for registering events, and for creating and associating event identifiers and event types with registered events during performance of the one or more workflows.

8. The method of embodiment 5, wherein the application programming interface environment includes an inventory API configured to manage inventory manage inventory activities that include one or more of ordering, storage, and scheduling.

9. The method of embodiment 5, wherein the application programming interface environment includes a query service API configured to provide an interface for both internal systems and external systems to query event data during performance of the one or more workflows.

10. The method of any one of embodiments 1-9, wherein the event data is obtained by querying an event service application programming interface configured to provide one or more endpoints for data sources publishing the one or more of sample data, workcell and instrument data, assay requirements data, and consumables and labware data, and wherein the event service application programming interface aggregates metadata within the event data that provides context and association for defining the one or more state changes.

11. The method of any one of embodiments 1-10, wherein the sample data includes sample information that includes one or more of an identity, a volume, a concentration, a condition, and a storage of a sample, processing environment requirements information, and sample constraints, in the workflow cycle.

12. The method of any one of embodiments 1-11, wherein the workcell and instrument data includes information representing capabilities, configurations, limitations, and a status of workcells and instruments in the workflow cycle.

13. The method of any one of embodiments 1-12, wherein the assay requirements include timing, acceptable deviations, and consumables and reagent requirements for assays performed in the workflow cycle.

14. The method of any one of embodiments 1-13, further comprising integrating third party systems that includes one or more of laboratory information management systems and an electronic laboratory notebook, and monitoring the event data to identify state change events such as liquid transfers, sample weighing, container taring, and publishing one or more messages to the third-party systems to update those systems based on the state change events.

15. The method of any one of embodiments 1-14, further comprising predicting one or more actions in additional workflow cycles based on the one or more state changes, and publishing one or more additional messages to execute the one or more actions in the additional workflow cycles.

16. A method of contextualizing an event state in a performance of laboratory workflows, comprising: initiating a data services model configured to analyze one or more state changes in a workflow cycle, by defining at least one event within the workflow cycle from event data received within an orchestrator environment for managing a plurality of laboratory workflows that includes one or more of sample data, workcell and instrument data, assay requirements data, and consumables and labware data; executing the data services model by applying a recursive algorithm to query at least one node within a data structure representing the workflow cycle by searching temporal slices relative to the at least one node by activities associated with a state of the at least one event, extracting data points describing the state of the at least one event at the temporal slices, and contrasting the data points to define the one or more state changes in the at least one event at each node, and isolating the activities producing the one or more state changes to re-create the state of the at least one event, and adding the data points defining the one or more state changes to contextualize the state of the at least one event at one or more time periods in the workflow cycle to explain the one or more state changes in the at least one event; wherein an event message broker publishes one or more messages having a payload representing contextualized event data for subscription to the orchestrator environment, and wherein one or more activities relative to the workflow cycle are automatically executed in response to the one or more messages.

17. The method of embodiment 16, wherein a schedule of one or more additional laboratory activities is generated in response to the one or more messages, and the one or more additional laboratory are automatically executed according to the schedule.

18. The method of embodiments 16 or 17, wherein the orchestrator environment is a data management platform for integrating a performance of the plurality of laboratory workflows, the orchestrator environment including one or more of an order manager, a transportation manager, a data services manager, a scheduler, an IoT agent, and a workflow manager.

19. The method of embodiment 18, wherein the one or more messages are published within an application programming interface environment that integrates the subscription to the one or more messages and responses to the one or more messages, by processing messages published back from the orchestrator environment.

20. The method of embodiment 19, wherein the application programming interface environment includes one or more transportation APIs configured to provide an interface for fulfillment of transportation requests during performance of the one or more workflows.

21. The method of embodiment 19, wherein the application programming interface environment includes an accessioning service API configured to provide an interface for registering events, and for creating and associating event identifiers and event types with registered events during performance of the one or more workflows.

22. The method of embodiment 19, wherein the application programming interface environment includes an inventory API configured to manage inventory manage inventory activities that include one or more of ordering, storage, and scheduling.

23. The method of embodiment 19, wherein the application programming interface environment includes a query service API configured to provide an interface for both internal systems and external systems to query event data during performance of the one or more workflows.

24. The method of any one of embodiments 16-23, wherein the event data is obtained by querying an event service application programming interface configured to provide one or more endpoints for data sources publishing the one or more of sample data, workcell and instrument data, assay requirements data, and consumables and labware data, and wherein the event service application programming interface aggregates metadata within the event data that provides context and association for defining the one or more state changes.

25. The method of any one of embodiments 16-24, wherein the sample data includes sample information that includes one or more of an identity, a volume, a concentration, a condition, and a storage of a sample, processing environment requirements information, and sample constraints, in the workflow cycle.

26. The method of any one of embodiments 16-25, wherein the workcell and instrument data includes information representing capabilities, configurations, limitations, and a status of workcells and instruments in the workflow cycle.

27. The method of any one of embodiments 16-26, wherein the assay requirements include timing, acceptable deviations, and consumables and reagent requirements for assays performed in the workflow cycle.
28. The method of any one of embodiments 16-27, further comprising integrating third party systems that includes one or more of laboratory information management systems and an electronic laboratory notebook, and monitoring the event data to identify state change events such as liquid transfers, sample weighing, container taring, and publishing one or more messages to the third-party systems to update those systems based on the state change events.
29. The method of any one of embodiments 16-28, further comprising predicting one or more actions in additional workflow cycles based on the one or more state changes, and publishing one or more additional messages to execute the one or more actions in the additional workflow cycles.
30. A system for contextualizing an event state in a performance of laboratory workflows, comprising: a data collection and initialization element, configured to define at least one event within a workflow cycle from event data received within an orchestrator environment for managing a plurality of laboratory workflows that includes one or more of sample data, workcell and instrument data, assay requirements data, and consumables and labware data; a data services model configured to analyze one or more state changes in the event data, the data services model comprised of a recursive algorithm configured to query at least one node within a data structure representing the workflow cycle by searching temporal slices relative to the at least one node by activities associated with a state of the at least one event, extracting data points describing the state of the at least one event at the temporal slices, and contrasting the data points to define the one or more state changes in the at least one event at each node, and one or more real-time data analytics and transform elements configured to explain the one or more state changes in the at least one event, by isolating the activities producing the one or more state changes to re-create the state of the at least one event, and adding the data points defining the one or more state changes to contextualize the state of the at least one event at one or more time periods in the workflow cycle; and an event message broker, configured at least to publish one or more messages having a payload representing contextualized event data for subscription to the orchestrator environment, wherein one or more activities in the workflow cycle are automatically executed in response to the one or more messages.
31. The system of embodiment 30, wherein a schedule of additional laboratory activities in the workflow cycle is generated in response to the one or more messages, and wherein the additional laboratory activities are automatically executed according to the schedule.
32. The system of embodiments 30 or 31, wherein the orchestrator environment is a data management platform for integrating a performance of the plurality of laboratory workflows, the orchestrator environment including one or more of an order manager, a transportation manager, a data services manager, a scheduler, an IoT agent, and a workflow manager.
33. The system of embodiment 32, wherein the one or more messages are published within an application programming interface environment that integrates the subscription to the one or more messages and responses to the one or more messages, by processing messages published back from the orchestrator environment.
34. The system of embodiment 33, wherein the application programming interface environment includes one or more transportation APIs configured to provide an interface for fulfillment of transportation requests during performance of the one or more workflows.
35. The system of embodiment 33, wherein the application programming interface environment includes an accessioning service API configured to provide an interface for registering events, and for creating and associating event identifiers and event types with registered events during performance of the one or more workflows.
36. The system of embodiment 33, wherein the application programming interface environment includes an inventory API configured to manage inventory manage inventory activities that include one or more of ordering, storage, and scheduling.
37. The system of embodiment 33, wherein the application programming interface environment includes a query service API configured to provide an interface for both internal systems and external systems to query event data during performance of the one or more workflows.
38. The system of any one of embodiments 30-37, wherein the event data is obtained by querying an event service application programming interface configured to provide one or more endpoints for data sources publishing the one or more of sample data, workcell and instrument data, assay requirements data, and consumables and labware data, and wherein the event service application programming interface aggregates metadata within the event data that provides context and association for defining the one or more state changes.
39. The system of any one of embodiments 30-38, wherein the sample data includes sample information that includes one or more of an identity, a volume, a concentration, a condition, and a storage of a sample, processing environment requirements information, and sample constraints, in the workflow cycle.
40. The system of any one of embodiments 30-39, wherein the workcell and instrument data includes information representing capabilities, configurations, limitations, and a status of workcells and instruments in the workflow cycle.
41. The system of any one of embodiments 30-40, wherein the assay requirements include timing, acceptable deviations, and consumables and reagent requirements for assays performed in the workflow cycle.
42. The system of any one of embodiments 30-41, further comprising an informatics adaptor configured to integrate third party systems that includes one or more of laboratory information management systems and an electronic laboratory notebook, and monitoring the event data to identify state change events such as liquid transfers, sample weighing, container taring, and publishing one or more messages to the third-party systems to update those systems based on the state change events.
43. The system of any one of embodiments 30-42, wherein the data services model is further configured to predict one or more actions in additional workflow cycles based on the one or more state changes, and publishing one or more additional messages to execute the one or more actions in the additional workflow cycles.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. Still further, the present invention may be implemented in cloud-based data processing environments, and where one or more types of servers are used to process large amounts of data, and using processing components such as CPUs (central processing units), GPUs (graphics processing units), TPUs (tensor processing units), and other similar hardware. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention and such examples are not limiting thereto. As such, the specific embodiments are not intended to be exhaustive or to limit the invention to the precise forms disclosed. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims. In addition, all methods described herein can be performed in any suitable order unless otherwise indicated herein or otherwise clearly contradicted by context. Therefore, it should be understood that embodiments of the disclosed subject matter are in no way limited to a particular element, compound, composition, component, article, apparatus, methodology, use, protocol, step, and/or limitation described herein, unless expressly stated as such.

While aspects of the invention have been described with reference to at least one exemplary embodiment, it is to be clearly understood by those skilled in the art that the invention is not limited thereto. Furthermore, those of ordinary skill in the art will recognize that certain changes, modifications, permutations, alterations, additions, subtractions, and sub-combinations thereof can be made in accordance with the teachings herein without departing from the spirit of the present invention. It is intended that the following appended claims and claims hereafter introduced are interpreted to include all such changes, modifications, permutations, alterations, additions, subtractions, and sub-combinations as are within their true spirit and scope. Accordingly, the scope of the present invention is not to be limited to that precisely as shown and described by this specification. Rather, the scope of the invention is to be interpreted only in conjunction with the appended claims and it is made clear, here, that the inventor(s) believe that the claimed subject matter is the invention.

Certain embodiments of the present invention are described herein, including the best mode known to the inventors for conducting the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps and/or limitations may be made for any one of the elements, steps or limitations in a claim set forth below or that a single element, step, or limitation may be substituted for two or more elements, steps and/or limitations in such a claim. Although elements, steps or limitations may be described above as acting in certain combinations and even initially claimed as such, it is to be expressly understood that one or more elements, steps and/or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more, or different elements, steps and/or limitations, which are disclosed in above combination even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Unless the context dictates the contrary, all ranges set forth herein should be interpreted as being inclusive of their endpoints and open-ended ranges should be interpreted to include only commercially practical values. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a comparable manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc.—for identified elements are used to distinguish between the elements, and do not indicate or imply a required or limited number of such elements, and do not indicate a particular position or order of such elements unless otherwise specifically stated.

When used in the claims, whether as filed or added per amendment, the open-ended transitional term "comprising", variations thereof such as, e.g., "comprise" and "comprises", and equivalent open-ended transitional phrases thereof like "including", "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the methods and the order in which the respective elements of each method are performed are purely exemplary. Depending on the implementation, they may be performed in any order or in parallel, unless indicated otherwise in the present disclosure.

Finally, all patents, patent publications, and other references cited and identified in the present specification are individually and expressly incorporated herein by reference in their entirety to the same extent as if each individual publication or patent application were specifically and individually indicated to be incorporated by reference. These publications are provided solely for their disclosure prior to the filing date of the present application. The reference to any prior art in this specification is not, and should not be taken as, an acknowledgement or any form of suggestion that the prior art forms part of the common general knowledge from any country. In addition, where a definition or use of a term in an incorporated reference is inconsistent or contrary to the definition of that term provided herein, the definition of that term provided herein applies and the definition of that term in the reference does not apply. Lastly, nothing in this regard is or should be construed as an admission that the inventors are not entitled to antedate such disclosure by virtue of prior invention or for any other reason. All statements as to the date or representation as to the contents of these documents are based on the information available to the applicant and do not constitute any admission as to the correctness of the dates or contents of these documents.

The invention claimed is:

1. A method of contextualizing an event state in a performance of laboratory workflows, comprising:
   ingesting, within an orchestrator environment for managing a plurality of laboratory workflows, event data that includes one or more of sample data, workcell and instrument data, assay requirements data, and consumables and labware data;
   modeling one or more state changes in the event data, by identifying at least one event within a workflow cycle,
      recursively querying at least one node within a data structure representing the workflow cycle by searching temporal slices relative to the at least one node by activities associated with a state of the at least one event, extracting data points describing the state of the at least one event at the temporal slices, and contrasting the data points to define one or more state changes in the at least one event at each node, and
      explaining the one or more state changes in the at least one event, by isolating the activities producing the one or more state changes to re-create the state of the at least one event, and adding the data points defining the one or more state changes to contextualize the state of the at least one event at one or more time periods in the workflow cycle;
   publishing one or more messages having a payload representing contextualized event data for subscription to the orchestrator environment; and
   automatically executing one or more laboratory activities relative to the workflow in response to the one or more messages,
   wherein the one or more laboratory activities involve one or both of laboratory samples or labware and are executed in response to the one or more messages to perform at least a part of a laboratory workflow, and include actuating a robotic instrument to perform a particular physical function on materials that either handles or transfers the one or both of laboratory samples or labware in at least one workcell.

2. The method of claim 1, wherein the one or more messages include instructions for the automatically executing the one or more laboratory activities.

3. The method of claim 1, further comprising generating a schedule of additional laboratory activities in the workflow cycle, in response to the one or more messages, and automatically executing the additional laboratory activities according to the schedule.

4. The method of claim 1, wherein the orchestrator environment is a data management platform for integrating a performance of the plurality of laboratory workflows, the orchestrator environment including one or more of an order manager, a transportation manager, a data services manager, a scheduler, an IoT agent, and a workflow manager.

5. The method of claim 4, wherein the one or more messages are published within an application programming interface environment that integrates the subscription to the one or more messages and responses to the one or more messages, by processing messages published back from the orchestrator environment.

6. The method of claim 5, wherein the application programming interface environment includes one or more of an accessioning service API configured to provide an interface for registering events, and for creating and associating event identifiers and event types with registered events during performance of the one or more workflows, an inventory API configured to manage inventory manage inventory activities that include one or more of ordering, storage, and scheduling, a query service API configured to provide an interface for both internal systems and external systems to query event data during performance of the one or more workflows, and at least one transportation API configured to provide an interface for fulfillment of transportation requests during performance of the one or more workflows.

7. The method of claim 1, further comprising predicting one or more actions in additional workflow cycles based on the one or more state changes, and publishing one or more additional messages to execute the one or more actions in the additional workflow cycles.

8. A method of contextualizing an event state in a performance of laboratory workflows, comprising:
    initiating a data services model configured to analyze one or more state changes in a workflow cycle, by defining at least one event within the workflow cycle from event data received within an orchestrator environment for managing a plurality of laboratory workflows that includes one or more of sample data, workcell and instrument data, assay requirements data, and consumables and labware data;
    executing the data services model by
        applying a recursive algorithm to query at least one node within a data structure representing the workflow cycle by searching temporal slices relative to the at least one node by activities associated with a state of the at least one event, extracting data points describing the state of the at least one event at the temporal slices, and contrasting the data points to define the one or more state changes in the at least one event at each node, and
        isolating the activities producing the one or more state changes to re-create the state of the at least one event, and adding the data points defining the one or more state changes to contextualize the state of the at least one event at one or more time periods in the workflow cycle to explain the one or more state changes in the at least one event;
    wherein an event message broker publishes one or more messages having a payload representing contextualized event data for subscription to the orchestrator environment, and wherein one or more activities relative to the workflow cycle are automatically executed in response to the one or more messages, and
    wherein the one or more laboratory activities involve one or both of laboratory samples or labware and are executed in response to the one or more messages to perform at least a part of a laboratory workflow, and include actuating a robotic instrument to perform a particular physical function on materials that either handles or transfers the one or both of laboratory samples or labware in at least one workcell.

9. The method of claim 8, wherein a schedule of one or more additional laboratory activities is generated in response to the one or more messages, and the one or more additional laboratory are automatically executed according to the schedule.

10. The method of claim 8, wherein the orchestrator environment is a data management platform for integrating a performance of the plurality of laboratory workflows, the orchestrator environment including one or more of an order manager, a transportation manager, a data services manager, a scheduler, an IoT agent, and a workflow manager.

11. The method of claim 10, wherein the one or more messages are published within an application programming interface environment that integrates the subscription to the one or more messages and responses to the one or more messages, by processing messages published back from the orchestrator environment.

12. The method of claim 11, wherein the application programming interface environment includes one or more of an accessioning service API configured to provide an interface for registering events, and for creating and associating event identifiers and event types with registered events during performance of the one or more workflows, an inventory API configured to manage inventory manage inventory activities that include one or more of ordering, storage, and scheduling, a query service API configured to provide an interface for both internal systems and external systems to query event data during performance of the one or more workflows, and at least one transportation API configured to provide an interface for fulfillment of transportation requests during performance of the one or more workflows.

13. The method of claim 8, further comprising predicting one or more actions in additional workflow cycles based on the one or more state changes, and publishing one or more additional messages to execute the one or more actions in the additional workflow cycles.

14. A system for contextualizing an event state in a performance of laboratory workflows, comprising:
    a data collection and initialization element, configured to define at least one event within a workflow cycle from event data received within an orchestrator environment for managing a plurality of laboratory workflows that includes one or more of sample data, workcell and instrument data, assay requirements data, and consumables and labware data;
    a data services model configured to analyze one or more state changes in the event data, the data services model comprised of
        a recursive algorithm configured to query at least one node within a data structure representing the workflow cycle by searching temporal slices relative to the at least one node by activities associated with a state of the at least one event, extracting data points describing the state of the at least one event at the temporal slices, and contrasting the data points to define the one or more state changes in the at least one event at each node, and
        one or more real-time data analytics and transform elements configured to explain the one or more state changes in the at least one event, by isolating the activities producing the one or more state changes to re-create the state of the at least one event, and adding the data points defining the one or more state changes to contextualize the state of the at least one event at one or more time periods in the workflow cycle; and an event message broker, configured at least to publish one or more messages having a payload representing contextualized event data for subscription to the orchestrator environment, wherein one or more activities in the workflow cycle are automatically executed in response to the one or more messages, and wherein the one or more laboratory activities involve one or both of laboratory samples or labware and are executed in response to the one or more messages to perform at least a part of a laboratory workflow, and include actuating a robotic instrument to perform a particular physical function on materials that either handles or transfers the one or both of laboratory samples or labware in at least one workcell.

15. The system of claim 14, wherein a schedule of additional laboratory activities in the workflow cycle is generated in response to the one or more messages, and wherein the additional laboratory activities are automatically executed according to the schedule.

16. The system of claim 14, wherein the orchestrator environment is a data management platform for integrating a performance of the plurality of laboratory workflows, the orchestrator environment including one or more of an order manager, a transportation manager, a data services manager, a scheduler, an IoT agent, and a workflow manager.

17. The system of claim 16, wherein the one or more messages are published within an application programming interface environment that integrates the subscription to the one or more messages and responses to the one or more messages, by processing messages published back from the orchestrator environment.

18. The system of claim 17, wherein the application programming interface environment includes one or more of an accessioning service API configured to provide an interface for registering events, and for creating and associating event identifiers and event types with registered events during performance of the one or more workflows, an inventory API configured to manage inventory manage inventory activities that include one or more of ordering, storage, and scheduling, a query service API configured to provide an interface for both internal systems and external systems to query event data during performance of the one or more workflows, and at least one transportation API configured to provide an interface for fulfillment of transportation requests during performance of the one or more workflows.

19. The system of claim 14, wherein the data services model is further configured to predict one or more actions in additional workflow cycles based on the one or more state changes, and publishing one or more additional messages to execute the one or more actions in the additional workflow cycles.

* * * * *